Aug. 12, 1969  D. J. THOMAS  3,460,716
MIXING ASSEMBLY FOR A DISPENSER
Filed July 14, 1967  2 Sheets-Sheet 1
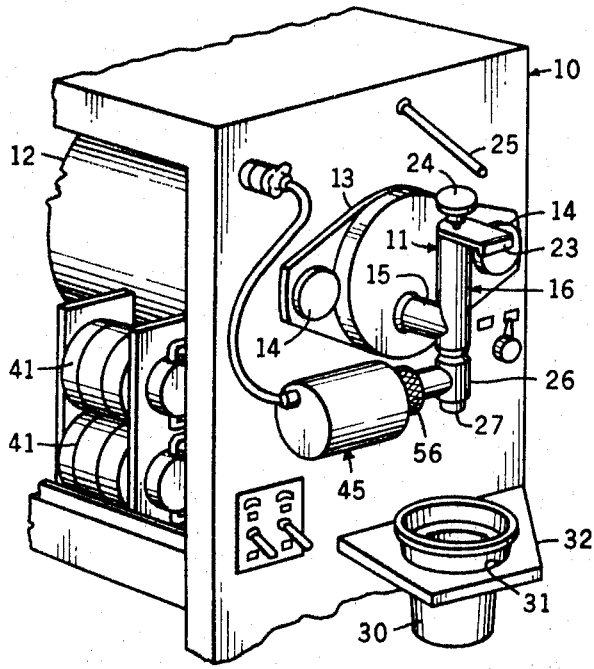
FIG. 1
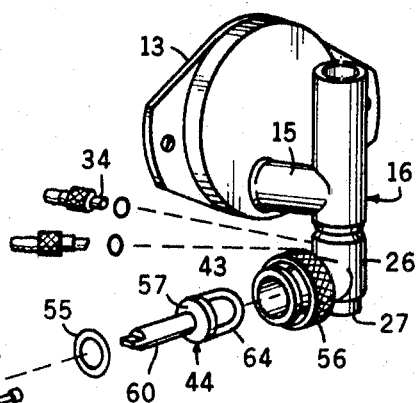
FIG. 2
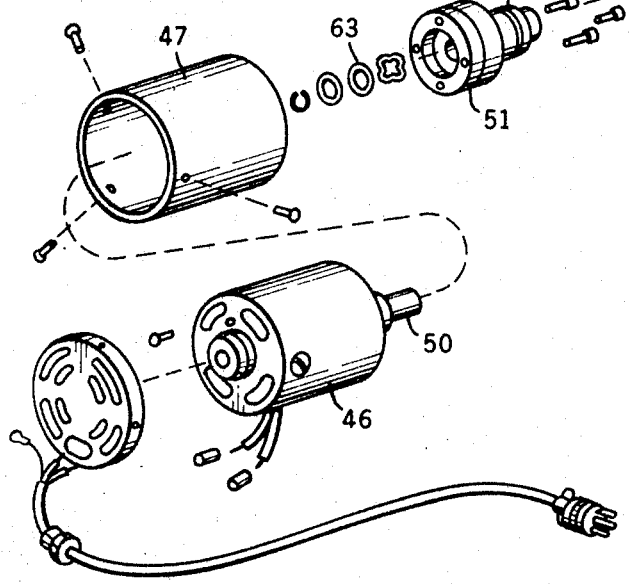
INVENTOR
DONALD J. THOMAS
BY
*Cohn and Powell*
ATTORNEYS

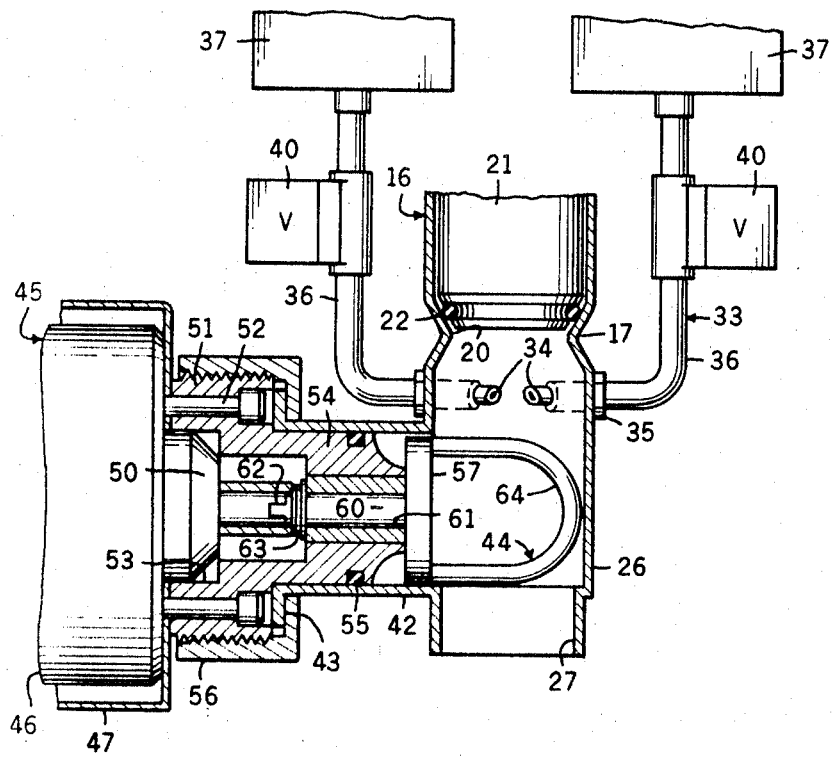

United States Patent Office 3,460,716
Patented Aug. 12, 1969

3,460,716
MIXING ASSEMBLY FOR A DISPENSER
Donald J. Thomas, Town and Country, Mo., assignor to Burger Chef Systems, Inc., Indianapolis, Ind., a corporation of Indiana
Filed July 14, 1967, Ser. No. 653,364
Int. Cl. B67d 5/56, 5/60
U.S. Cl. 222—129.1                    4 Claims

ABSTRACT OF THE DISCLOSURE

A mixing assembly for a dispenser of fluid and semi-fluid substances such as shakes, slush and soft ice cream, which includes an impeller located in a dispensing nozzle just upstream of a discharge outlet and just downstream of the entrance provided for the introduction of a flavoring. A drive means, carried by the nozzle, rotates the impeller on an axis arranged at an angle to the longitudinal flow axis of nozzle end extending between the valve means controlling flow through the nozzle and the discharge outlet. The impeller mixes the flavoring and substance in the nozzle upon opening the valve means. The centrifugal action cleans the nozzle end and impeller by throwing the mix out the discharge outlet after the valve means is closed and the flavoring feed means is deactivated.

Background of the invention

This invention relates generally to improvements in a mixing assembly for a dispenser, and more particularly to a mixer of this type adapted to mix a flavor in substances such as shakes, slush and soft ice cream in a dispensing nozzle just prior to discharge.

In using the heretofore conventional dispensers, the soft, homogeneous substance, such as a shake, was discharged from a nozzle directly into a container. A flavoring was then added to the shake in the container. Of course, such flavoring could be added to the container before filling with the shake. Then, the container was placed in a mixer with the impeller submerged in the shake, and the shake was mixed. This procedure was time-consuming, required several individual and distinct steps, and the mixer impeller had to be cleaned after each operation in order to avoid contamination of subsequent shakes, particularly if the shake were of a different flavor.

Other types of dispensers have a mixer carried directly by the dispenser and located adjacent the nozzle. Flavoring is added to the container, and the container is placed under the nozzle with the mixer impeller inserted. The shake is discharged into the container and the mixer is energized to mix the flavoring. Again, this procedure involves a number of different, separate steps, and requires a cleaning of the impeller if contamination of subsequent shakes is to be avoided.

Summary of the invention

The present mixing assembly utilizes an impeller in the nozzle immediately downstream of the point at which flavoring is introduced into the nozzle by a feed means, the impeller being turned by a drive means to mix the flavoring with the shake substance passing through the nozzle. The shake is completely stirred before, yet immediately prior to, discharge from the nozzle into the container.

The introduction of flavoring as an ingredient into a homogeneous substance, and spinning it in by an impeller at the last moment in the nozzle, provides a resultant shake or product that is really different than a shake preflavored before freezing and equal to a shake that is mixed externally of the nozzle. Because the flavoring ingredient is not completely dispersed, although well stirred, the shake has varying concentrations and sizes of ice crystals and flavoring and free water which achieves a unique and pleasing taste.

The axis of rotation of the impeller is angularly related to the longitudinal flow axis of the nozzle so that the impeller effectively cleans the nozzle and itself under centrifugal force by throwing the mix out the discharge outlet when the control valve means is closed. This self-cleaning action of the impeller eliminates the need for a wash cycle to cleanse the impeller and nozzle interior between shakes. Preferably, the axis of rotation of the impeller is substantially at a right angle to the longitudinal flow axis of the nozzle, and the impeller includes a substantially C-shaped rod located adjacent the internal wall of the nozzle.

For most efficient operation and structural arrangement, the nozzle is disposed substantially vertical with the discharge outlet opening at its bottom, and the drive means is carried by the nozzle and provides a substantially horizontal, rotational axis on which the impeller turns during the mixing and cleansing procedure. In addition, the valve means includes a port in the nozzle upstream of and adjacent to the entrance of the feed means into the nozzle, while the impeller is disposed in the nozzle adjacent to and downstream of such flavoring entrance. The discharge outlet is adjacent to and downstream of the impeller.

Other functional advantages are realized by the mounting of the drive means on the nozzle, and the specific construction of the impeller that cooperates with such mounting to achieve an uninhibited flow through the nozzle and a seal for the motor, yet enables quick and easy disconnection of the motor and removal of the impeller from the nozzle for ease of maintenance.

A control means operatively interconnects the valve means with the drive means and feed means so that the feed means introduces flavoring into the nozzle when the valve means is open, and stops the introduction of flavoring when the valve means is closed, and so that the drive means is energized to turn the impeller when the valve means is open and to turn the impeller for a short time period after the valve means is closed in order to effect a cleaning action.

Brief description of the drawings

FIG. 1 is a fragmentary perspective view showing the mixing assembly on a dispenser;

FIG. 2 is an exploded view of the mixing assembly, and

FIG. 3 is a cross sectional view of the assembly.

Description of the preferred embodiments

Referring now by characters of reference to the drawings, and first to FIG. 1, it will be understood that the dispenser generally indicated by 10 is of the type adapted to dispense a fluid or semi-fluid substance such as a shake, ice slush or soft ice cream. The dispenser in FIG. 1 illustrates the environment in which the mixing assembly referred to by 11 can be utilized.

For the purpose of describing the structure and operation of the dispenser 10 and mixing assembly 11, the dispensed substance will be called a shake. The shake is usually stored in a refrigerated reservoir 12 within the cabinet of dispenser 10. A plate 13 is fixed to the front wall of the dispenser cabinet by a pair of bolts 14, the plate 13 overlying the front end of reservoir 12. A tube 15 carried by and extending through the plate 13 communicates with the interior of reservoir 12. The shake is selectively discharged from the reservoir 12 through the tube 15.

The mixing assembly 11 includes an elongate, tubular nozzle 16 disposed with its longitudinal flow axis arranged vertically. The nozzle 16 communicates with the discharge tube 15 so that the shake passes through the tube 15 and into the nozzle 16. Tube 15 is disposed substantially horizontally and communicates with the nozzle 16 at one side.

From FIG. 3, it is seen that the nozzle 16 includes a reduced diameter portion 17 that forms a valve port 20. The valve means for controlling flow of the shake through the nozzle 16 includes an elongate valve plug 21 slidably and reciprocatively mounted in the nozzle 16 above the valve port 20. Carried by the lower end of the valve plug 21 is an O-ring 22 that engages the interior wall of the nozzle 16 at the reduced diameter portion 17 to provide an effective seal to close the valve port 20 when the valve plug 21 is lowered to the position illustrated in FIG. 3.

Attached to and carried by the upper end of the valve plug 21 is a laterally extending handle 23 (FIG. 1) which may be digitally gripped to lift the valve plug 21 and open the valve port 20. For reasons which will later appear, a knob 24 is attached to and movable with the valve plug 21, the knob 24 selectively engaging and moving an actuating arm 25 of a microswitch (not shown) incorporated in the electrical circuit. The nozzle 16 includes a vertically extending nozzle end 26 below the valve port 20, the nozzle end 26 being provided with a discharge outlet 27 at its bottom.

Upon lifting the valve plug 21, the valve port 20 is opened and the shake is fed into the nozzle 16 through the tube 15 from the reservoir 12, and then is fed through the valve port 20, through the nozzle end 26 and out the discharge outlet 27.

As is shown in FIG. 1, a container 30 is located below the nozzle end 26 in a position to receive possible drippage only. For convenience, the container 30 is located in an opening 31 formed in a platform 32 extending forwardly from the front wall of the dispenser cabinet, the platform 32 supporting the container 30.

Flavoring is added to the shake in the nozzle end 26 through a feed means generally indicated by 33. In the embodiment shown in FIG. 3, the feed means 33 includes a pair of injector nozzles 34 mounted on a collar 35 fixed to the nozzle end 26 and projecting into the interior of the nozzle end 26 immediately adjacent and below the valve port 20. Each injector nozzle 34 is connected by a line 36 to a flavoring tank 37 through a suitable solenoid valve 40. Each of the tanks 37 carries a different flavoring. While a pair of tanks 37 and cooperating injector nozzle 34 are shown in FIG. 3, it will be understood that any number of such feed lines may be utilized depending upon the variety of flavorings desired. When a selected valve 40 is energized to open its associated line 36, the flavoring will move from the tank 37 by gravity through the line 36, will pass through the coacting ejector nozzle 34 into the nozzle end 26, and will pass into the shake flowing through the nozzle end 26.

The flavoring may be fed from suitable tanks by means of pumps 41 which are shown for illustrative purposes in the dispenser cabinet in FIG. 1. Either system may be utilized. When the electrical system is energized, the pump 41 associated with the flavoring selected will force flavoring from its tank through the coacting ejector nozzle 34.

Extending laterally from the nozzle 16 and communicating with the interior of the discharge nozzle end 26 is a mounting tube 42 having a peripheral, out-turned flange 43 at its end. The mounting tube 42 extends substantially horizontal.

Carried by the mounting tube 42 is an impeller assembly referred to by 44 and a drive means indicated by 45. The drive means 45 includes an electric motor 46 enclosed by a casing 47. The electric motor 46 has a drive shaft 50. A bearing plug 51 is secured by a plurality of nuts 52 to the front face of electric motor 46, the bearing plug 52 being provided with a recess 53 receiving the motor shaft 50. The bearing plug 51 includes a relatively large portion adjacent to the motor 46 which engages the flange 43 of the mounting tube 42, and includes a relatively reduced end portion 54 that closely interfits the mounting tube 42. An effective seal is provided between the plug end portion 54 and the mounting tube 42 by the provision of an O-ring 55 carried by the plug end 54 and engaging the inside wall of tube 42. A threaded collar 56, carried by the mounting tube 42, threadedly engages the bearing plug 51 to clamp the plug 51 securely to the tube flange 43. The drive motor 46 is securely mounted to the tube 42 and is disposed with the rotational axis of the drive shaft 50 located substantially horizontal.

The impeller assembly 44 is located in the discharge nozzle end 26 and is operatively connected to the motor shaft 50. More particularly, the impeller assembly 44 includes a circular base 57 having a diameter that closely approximates the inside diameter of the mounting tube 42 at the entrance of tube 42 with the discharge nozzle end 26 where the impeller base 57 is located. Extending from one side of the impeller base 57 is an impeller shaft 60 that is rotatively mounted in a bushing 61 carried in a bore formed in the reduced plug end 54. The impeller shaft 60 and the motor shaft 50 have a tongue and groove connection 62 at their adjacent ends, thereby forming an effective and positive drive connection. A plurality of washers 63, one of which is a spring washer, are carried by the end of impeller shaft 60, and are disposed between the motor shaft 50 and the bushing 61 to provide an effective seal at the drive connection.

The impeller assembly 44 includes an impeller 64, consisting of a substantially C-shaped rod, extending from the opposite side of the impeller base 57, and extending into the nozzle end 26 immediately below the injector nozzle 34 and immediately above the discharge outlet 27. The curved configuration of the C-shaped rod conforms to the internal diameter of the nozzle end 26 so that upon rotation of the impeller assembly 44, the C-shaped rod essentially wipes the inside of the nozzle end 26. The rotational axis of the impeller assembly 44 is aligned with the axis of motor shaft 50 so that the coincident rotational axis is substantially at a right angle to the longitudinal flow axis of the nozzle end 26.

When the shake flows through the nozzle end 26, flavoring is introduced into the nozzle end 26 through at least one of the injector nozzles 34 and the electric motor 46 is energized to turn the impeller assembly 44. The stirring action of the impeller 64 mixes the flavoring into the shake as both the flavoring and shake pass by the impeller 64. In addition, the centrifugal action of the impeller 64 throws the resultant shake mix through the discharge outlet 27, and a container held below the outlet 27.

After the desired quantity of shake is mixed with flavoring and discharged into a container, the flow of the shake through the nozzle end 26 is halted, but the impeller assembly 44 continues to spin for several seconds. During this subsequent spinning action of impeller assembly 44, the impeller 64, under centrifugal force created by the spinning, cleans the nozzle end 26 and the impeller 64 itself by throwing any residue of shake and flavoring out through the discharge outlet 27. Because the impeller assembly 44 is self-cleaning, it is not necessary to provide mechanism for flushing the impeller assembly 44 and nozzle end 26 in a wash cycle between mixing of shakes.

Because the impeller base 57 closely approximates the internal diameter of the mounting tube 42 at its entrance to the nozzle end 26, there is little, if any, shake that passes behind the impeller base 57 into the tube 42. In any event, the O-ring 55 provides an effective seal that precludes passage of material beyond the end of the bearing plug 54. Furthermore, the impeller base 57 engaging the bushing 61, and the washers 63 disposed between the impeller shaft 60 and bushing 61 prevent passage of material outwardly along the impeller shaft 60.

For usual maintenance and cleaning, the motor 46 and the attached impeller assembly 44 can be easily removed as a unit from the mounting tube 42. For example, the collar 56 is threadedly detached from the bearing plug 51, and the reduced plug end 54, together with the attached impeller assembly 44 is simply withdrawn out through the open end of the mounting tube 42. All of the component parts of the drive means 45 and the impeller assembly 44 can be cleaned quite easily. In addition, the interior of the mounting tube 42 and the nozzle end 26 can be readily cleaned also. The impeller assembly 44 and the drive means 45 is readily installed as a unit by sliding the impeller assembly 44 into the open end of the mounting tube 42. The reduced plug end 54 will slide into the tube 42 until the plug 51 abuts the tube flange 43. In this position, the impeller 64 is located in the nozzle end 26. Then, the plug 51, and hence the motor 46, is secured by threadedly attaching the collar 56 to the plug 51.

It is thought that the functional advantages of the mixing assembly have become fully apparent from the foregoing detailed description of parts, but for completeness of disclosure, the operation will be briefly described. It will be assumed that it is desired to dispense a shake having a particular flavor, such as strawberry. Further, it will be assumed that in this example a gravity feed system for introducing such flavoring is utilized as is shown in FIG. 3, although it will be understood that a system using pumps 41 could be employed if desired.

From FIG. 1, it is seen that the container 30 is located below the nozzle 16 and that the dispenser 10 is conditioned by a preselection mechanism for a particular flavoring. The operator lifts the handle 23 so as to raise the valve plug 21 and open the valve port 20, thereby allowing flow of the shake from the reservoir 12 into the nozzle 16 through the feed tube 15. Simultaneously, upon lifting the valve plug 21, the knob 24 will engage the actuating arm 25 of a microswitch (not shown), the microswitch being in an electrical circuit with the solenoid valves 40 and the drive motor 46. Upon closing the microswitch, one of the solenoid valves 40 is opened to permit flow of the selected flavoring from its tank 37 through the line 36 and into the nozzle end 26 through the associated ejector nozzle 34. At the same time, the motor 46 is energized and the impeller assembly 44 is rotated. As the shake passes through the valve port 20, the flavoring is introduced into the shake through the ejector nozzle 34. Immediately, the combined flavoring and shake is stirred vigorously by the impeller 64, mixing the flavoring and shake and discharging the resultant, flavored shake through the nozzle outlet 27 and into a container.

When the container is filled, the operator lowers the valve plug 21 to close the valve port 20, thereby stopping the flow of the shake through the nozzle 16. Simultaneously, when the valve plug 21 closes the valve port 20, the knob 24 disengages from the actuating arm 25 and the electrical circuit is opened to de-energize the solenoid valve 40 in the selected flavoring feed line 36. The valve 40 closes the feed line 36 and stops the introduction of flavoring into the nozzle end 26 through the associated injector nozzle 34. However, the motor 46 remains energized for several seconds after the valve port 20 is closed through a time delay means in the electrical circuit so that the impeller 64 continues to spin. The centrifugal action of the spinning impeller 64 cleans the impeller 64 and the nozzle end 26 by throwing the mixture of shake and flavoring out the discharge outlet 27 and into the container. The nozzle end 26 and the impeller 64 are cleaned and in condition for dispensing another shake mix of the same or different flavor. The time delay in the electrical circuit then operates automatically to de-energize the motor 46 after the cleaning action.

I claim as my invention:

1. A mixing assembly for a dispenser of fluid and semi-fluid substances such as shakes, slush and soft ice cream from a reservoir, the improvement comprising:
   (a) a nozzle having an inlet communicating with the reservoir, and having a discharge outlet,
   (b) a valve means controlling flow of the substance from the reservoir through the nozzle,
   (c) an impeller in the nozzle,
   (d) drive means selectively turning the impeller,
   (e) feed means introducing flavoring into the nozzle upstream of the impeller,
   (f) the valve means including a port in the nozzle upstream of and adjacent to the entrance of the feed means into the nozzle, and a valve member selectively opening or closing the port,
   (g) the impeller being disposed in the nozzle adjacent to and downstream of the entrance of the feed means into the nozzle,
   (h) the drive means rotating the impeller on an axis substantially at a right angle to the longitudinal flow axis of the nozzle extending between the valve port and discharge outlet,
   (i) the discharge outlet being adjacent to and downstream of the impeller,
   (j) the drive means being mounted on and carried by the nozzle,
   (k) the impeller tending to throw the mix out the discharge outlet under centrifugal force upon turning by the drive means,
   (l) the nozzle being disposed so that the longitudinal flow axis extending between the valve port and discharge outlet is substantially vertical with the discharge outlet opening at its bottom,
   (m) the said rotational axis of the drive means being substantially horizontal,
   (n) the nozzle including a tube extending laterally and opening between the flavoring feed means and discharge outlet,
   (o) the drive means including:
      (1) an electric motor having a drive shaft,
      (2) a bearing plug carried by the motor and interfitting the lateral nozzle tube,
      (3) sealing means between the lateral nozzle tube and plug,
      (4) the impeller having a shaft mounted in the plug and connected to the motor shaft, and having a base closely interfitting the lateral nozzle tube at the entrance of the tube to the nozzle, and
   (p) fastening means securing the lateral nozzle tube to the bearing plug so that the motor is carried by the nozzle.

2. A mixing assembly as defined in claim 1, in which:
   (q) the impeller includes a substantially C-shaped rod extending laterally from the impeller base and into the nozzle between and adjacent the entrance of the flavoring feed means and the discharge outlet.

3. A mixing assembly for a dispenser of fluid and semi-fluid substances such as shakes, slush and soft ice cream from a reservoir, the improvement comprising:
   (a) a nozzle having an inlet communicating with the reservoir, and having a discharge outlet,
   (b) a valve means controlling flow of the substance from the reservoir through the nozzle,
   (c) an impeller in the nozzle,
   (d) drive means selectively turning the impeller,
   (e) feed means introducing flavoring into the nozzle upstream of the impeller,
   (f) the valve means including a port in the nozzle upstream of and adjacent to the entrance of the feed means into the nozzle, and a valve member selectively opening or closing the port,
   (g) the impeller being disposed in the nozzle adjacent to and downstream of the entrance of the feed means into the nozzle,
   (h) the drive means rotating the impeller on an axis substantially at a right angle to the longitudinal flow axis of the nozzle extending between the valve port and discharge outlet,
   (i) the discharge outlet being adjacent to and downstream of the impeller, (j) the drive means being mounted on and carried by the nozzle, (k) the impeller tending to throw the mix out the discharge outlet under centrifugal force upon turning by the drive means, (l) means operatively interconnecting the valve means with the drive means and the feed means so that feed means introduces flavoring into the nozzle when the valve means is opened and stops the introduction of flavoring when the valve means is closed, and so that the drive means is energized to turn the impeller when the valve means is opened and to turn the impeller for a short time period after the valve means is closed in order to effect a cleaning action.

4. A mixing assembly for a dispenser of fluid and semi-fluid substances such as shakes, slush and soft ice cream from a reservoir, the improvement comprising:

(a) a nozzle having an inlet communicating with the reservoir, and having a discharge outlet, (b) a valve means controlling flow of the substance from the reservoir through the nozzle, (c) an impeller in the nozzle, (d) drive means selectively turning the impeller, (e) feed means introducing flavoring into the nozzle upstream of the impeller, (f) the nozzle including a tube extending laterally and opening between the flavoring feed means and discharge outlet, (g) the drive means including:
  (1) an electric motor having a drive shaft,
  (2) a bearing plug carried by the motor and interfitting the lateral nozzle tube,
  (3) sealing means between the lateral nozzle tube and plug,
  (4) the impeller having a shaft mounted in the plug and connected to the motor shaft, and having a base closely interfitting the lateral nozzle tube at the entrance of the tube to the nozzle, and (h) fastening means securing the lateral nozzle tube to bearing plug so that the motor is carried by the nozzle.

References Cited

UNITED STATES PATENTS

| | | | |
|---|---|---|---|
| 2,726,026 | 12/1955 | Gould et al. | 222—129.4 |
| 3,159,190 | 12/1964 | Skiera et al. | 141—369 |
| 3,272,388 | 9/1966 | Whitmore | 222—129.1 |
| 3,276,633 | 10/1966 | Rahauser | 222—129.1 |
| 3,382,897 | 5/1968 | Skiera et al. | 144—107 |

WALTER SOBIN, Primary Examiner

U.S. Cl. X.R.

222—145